United States Patent
Aibester et al.

(10) Patent No.: US 11,500,737 B2
(45) Date of Patent: Nov. 15, 2022

(54) COHERENT CAPTURING OF SHARED-BUFFER STATUS

(71) Applicant: MELLANOX TECHNOLOGIES TLV LTD., Raanana (IL)

(72) Inventors: Niv Aibester, Herzliya (IL); Shmuel Shichrur, Tel Aviv (IL); Barak Gafni, Campbell, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 391 days.

(21) Appl. No.: 16/417,669

(22) Filed: May 21, 2019

(65) Prior Publication Data

US 2020/0371880 A1 Nov. 26, 2020

(51) Int. Cl.
*G06F 11/14* (2006.01)
*G06F 9/54* (2006.01)
*H04L 43/022* (2022.01)

(52) U.S. Cl.
CPC .......... *G06F 11/1464* (2013.01); *G06F 9/544* (2013.01); *G06F 11/1448* (2013.01); *H04L 43/022* (2013.01)

(58) Field of Classification Search
CPC .. G06F 11/1464; G06F 9/544; G06F 11/1448; H04L 43/022; H04L 43/12; H04L 41/069; H04L 41/0681
See application file for complete search history.

(56) References Cited

U.S. PATENT DOCUMENTS

| | | | |
|---|---|---|---|
| 2008/0065760 A1 | 3/2008 | Damm et al. | |
| 2011/0090798 A1* | 4/2011 | Hanes | H04L 65/1006 370/241 |
| 2014/0006871 A1 | 1/2014 | Lakshmanan et al. | |
| 2014/0280829 A1* | 9/2014 | Kjendal | H04L 43/028 709/223 |
| 2016/0210460 A1* | 7/2016 | Yang | G06F 21/78 |
| 2017/0026281 A1 | 1/2017 | Mogul et al. | |
| 2017/0163567 A1 | 6/2017 | Roitshtein et al. | |
| 2018/0063030 A1* | 3/2018 | Mitulal | H04L 47/29 |
| 2018/0288145 A1 | 10/2018 | Levy et al. | |

OTHER PUBLICATIONS

EP Application #20173312.8 Search Report dated Oct. 19, 2020.

* cited by examiner

*Primary Examiner* — David Yi
*Assistant Examiner* — Alan Otto
(74) *Attorney, Agent, or Firm* — Kligler & Associates Patent Attorneys Ltd (57) ABSTRACT

A network element includes multiple ports configured to communicate over a network, a buffer memory, a snapshot memory, and circuitry. The circuitry is configured to forward packets between the ports, to temporarily store information associated with the packets in the buffer memory, to continuously write at least part of the information to the snapshot memory concurrently with storage of the information in the buffer memory, and, in response to at least one predefined diagnostic event, to stop writing of the information to the snapshot memory, so as to create in the snapshot memory a coherent snapshot corresponding to a time of the diagnostic event.

24 Claims, 4 Drawing Sheets

COHERENT CAPTURING OF SHARED-BUFFER STATUS

FIELD OF THE INVENTION

The present invention relates generally to communication networks, and particularly to capturing of buffer status in network elements.

BACKGROUND OF THE INVENTION

In communication network elements, buffers may be used for temporary storage of communication packets and/or other data. For diagnostics purposes it may be necessary to analyze and/or diagnose the status of such buffers.

U.S. Patent Application Publication 2008/0065760 describes a network management system with adaptive sampled proactive diagnostic capabilities.

U.S. Patent Application Publication 2014/0006871 describes techniques for monitoring and diagnosis of a network comprising one or more devices.

SUMMARY OF THE INVENTION

An embodiment of the present invention that is described herein provides a network element including multiple ports configured to communicate over a network, a buffer memory, a snapshot memory, and circuitry. The circuitry is configured to forward packets between the ports, to temporarily store information associated with the packets in the buffer memory, to continuously write at least part of the information to the snapshot memory concurrently with storage of the information in the buffer memory, and, in response to at least one predefined diagnostic event, to stop writing of the information to the snapshot memory, so as to create in the snapshot memory a coherent snapshot corresponding to a time of the diagnostic event.

In some embodiments, the circuitry is configured to concurrently store in the buffer memory, and to include in the coherent snapshot, information relating to multiple packets associated with multiple processes or flows. In an embodiment, the information includes data carried by the packets. Additionally or alternatively, the information may include descriptors of the packets.

In a disclosed embodiment, the circuitry is configured to detect the predefined diagnostics event as part of forwarding the packets. In an example embodiment, in response to the predefined diagnostics event, the circuitry is configured to generate an interrupt indicative of the coherent snapshot. In another embodiment, in response to creation of the coherent snapshot, the circuitry is configured to send the coherent snapshot over the network.

There is additionally provided, in accordance with an embodiment of the present invention, a method including, in a network element that includes multiple ports connected to a network, forwarding packets between the ports. Information associated with the packets is temporarily stored in a buffer memory in the network element. Concurrently with storage of the information in the buffer memory, at least part of the information is continuously written to a snapshot memory in the network element. In response to at least one predefined diagnostic event, writing of the information to the snapshot memory is stopped, so as to create in the snapshot memory a coherent snapshot corresponding to a time of the diagnostic event.

The present invention will be more fully understood from the following detailed description of the embodiments thereof, taken together with the drawings in which:

DETAILED DESCRIPTION OF EMBODIMENTS

Overview

Network elements, such as network switches, receive packets from ingress ports and forward the packets to egress ports. A network switch typically comprises memories (referred to hereinbelow as Buffers) that temporarily store packets until they can be forwarded to the network. In some embodiments, a Buffer may also store control constructs, such as packet descriptors.

Embodiments of the present invention that are described herein provide improved methods and systems for buffer management that coherently monitor buffer status, allowing fabric congestion analysis. According to embodiments of the present invention, a network element comprises packet processing circuitry that receives packets through Ingress ports and forwards the packets to Egress ports. The packet processing circuitry may concurrently process a plurality of packets, and the buffer may be shared by a plurality of packet-forwarding processes.

In some embodiments, a buffer control circuitry manages the shared buffer, and creates a plurality of separately-controlled buffers within the shared buffer (referred to hereinbelow as Logical Buffers). The control circuitry organizes logical buffers as first-in-first-out queues, and then allocates queues to packet-forwarding processes, deallocates logical buffers of queues that are no longer needed; spills packets from congested queues to non-congested queues, changes the size of logical buffers, merges and splits logical buffers, etc.

In embodiments according to the present invention, events pertaining to increased usage of buffer resources, such as buffer congestions, may cause increased latency time, and possibly loss of packets or parts thereof. To improve network performance and to reduce the frequency of packet loss events, it is important to detect buffer congestion early on, understand why it happened, and, if possible, take measures (e.g., adaptation of shared buffers resources) to ease the congestion. Such events, as well as other suitable events that are valuable to detect and analyze, are referred to herein as "diagnostic events."

It is possible in principle to add circuits that detect diagnostics events, including failure events (e.g. —packet drop) or a developing congestion (e.g., queues exceeding a pre-set occupancy threshold). The analysis of the root of problems is not easy, however, because the status of the buffer continually changes as the network element forwards packets. For example, if some circuitry were to start reading the status of all queues when a packet is dropped, by the time the status of the last queue is read the queue status may differ considerably from the status at the time the packet was dropped.

According to an embodiment, the network element comprises Buffer Control and Monitoring (BCM) circuitry, which is configured to continually monitor the control-status of some or all the logical buffers, and to store ("record") a copy of the control-status in local memory. In an embodiment, control status recording of some or all the logical buffers, may be enabled and disabled by software control. In some embodiments, the buffer management circuitry is configured to stop updating ("freeze") some or all the recordings upon the occurrence of a diagnostics event. In an embodiment, the BCM will, after freezing the recording, indicate to a processor (such as a CPU) that a diagnostics event has occurred, and that a recording of the shared-buffer control-status is frozen.

In some embodiments, the processor may read the frozen recording (will be referred to as "snapshot" hereinafter); in other embodiments, the BCM circuitry writes the snapshot to the CPU memory; and in yet other embodiments the BCM circuitry transmits the snapshot over the network (for example, to a network monitoring server). The snapshot is coherent in the sense that all the elements of the recording are frozen at the same time, and therefore the entire recording is valid and correct for that point in time.

In some embodiments, the BCM circuitry is further configured to detect diagnostic events that may be significant to the analysis of the network performance (diagnostics events comprise, for example, a logical buffer exceeding a preset occupancy threshold). In other embodiments, the BCM circuitry receives the diagnostics events from other units of the network element, and in yet other embodiments some diagnostics events are input, whereas other diagnostics events are detected by the BCM circuitry.

In some embodiments according to the present invention, resource management may be done, at least partially, by dynamically adjusting queue thresholds (e.g. queue-occupancy thresholds that determine if new entries can be forwarded to the queue). In order to properly set the thresholds, it may be important to analyze the queue status when diagnostics events occur.

In some embodiments, the shared buffer comprises not only packets, but also data structures that pertain to packet control. For example, in an embodiment, the shared buffer may store packet descriptors queues.

In an embodiment, the snapshot that the CPU receives comprises separate status snapshots of all logical buffers, allowing a diagnostics software to analyze not only the status of the failed queue, but also of other queues that complete with the failed queue on shared-buffer resources.

In yet other embodiments, the snapshot comprises, in addition to the queue-fill information, also the thresholds that are used by the queue management. This may be important in embodiments wherein the thresholds change dynamically.

Thus, according to embodiments of the present invention that are provided herein, coherent snapshots of the shared buffer control-status are generated, wherein the status of all queues at the time that a diagnostics event was detected is registered (as opposed to registering the status of some queues at one time, close to the occurrence of the diagnostics event, and registering the status of other queues at a different time). Full observability is provided, enabling the analysis of the network element behavior within its surrounding, and the subsequent adaptation of shared buffer resources to avoid unwanted events.

System Description

Figure 1:
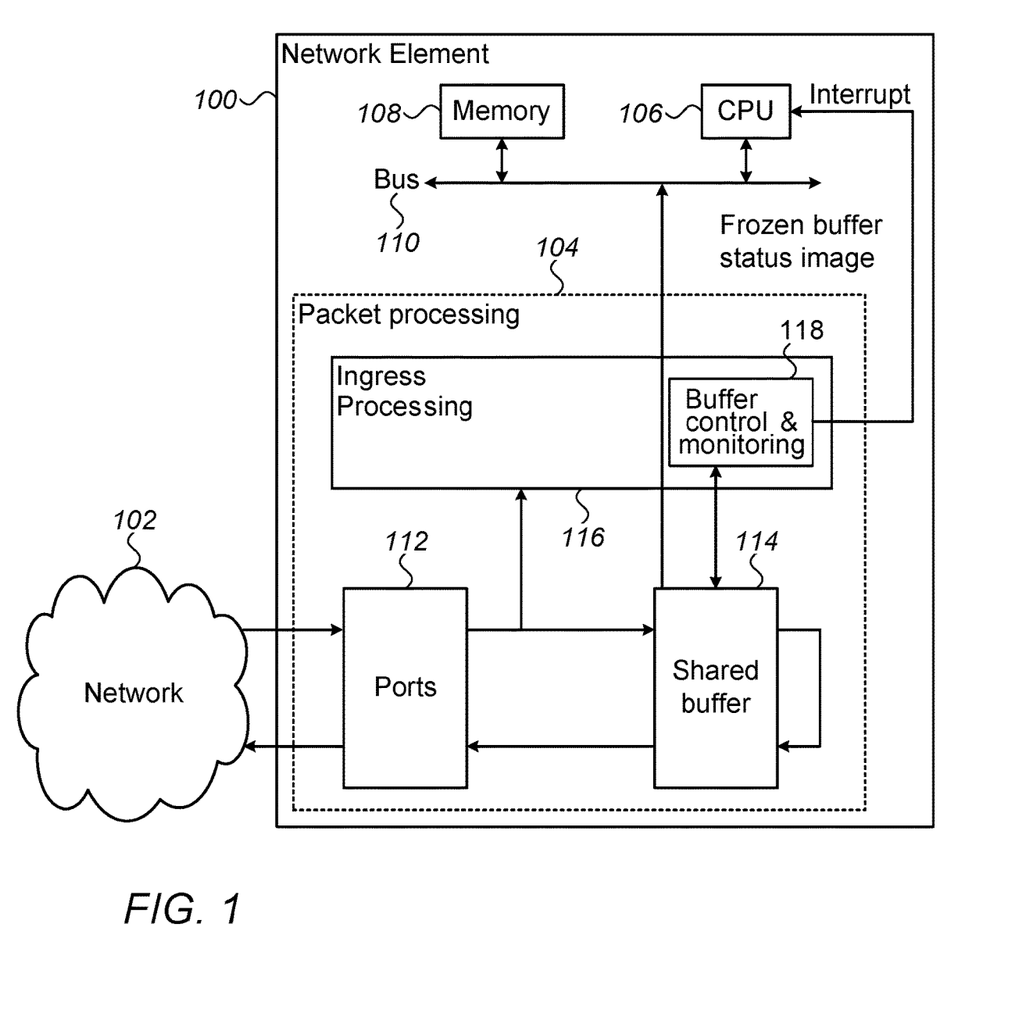
FIG. 1 is a block diagram that schematically illustrates a network element, in accordance with an embodiment of the present invention.

FIG. 1 is a block diagram that schematically illustrates a network element 100, in accordance with embodiments of the present invention. The network element communicates with a network 102, and comprises a Packet Processing unit 104, which receives and sends packets from/to the network; a CPU 106, which governs the network element's operation, a memory 108, which stores programs and data; and a suitable bus 110, which is configured to transfer data between the various units of the network element.

Packet Processing unit 104 comprises ports 112, which may comprise ingress and/or egress ports; a memory holding a Buffer 114 (referred to herein as "buffer memory"), which is configured to store packets; and, an Ingress Processing Unit 116. The Ingress Processing Unit comprises a Buffer Control and Monitoring unit ("BCM") 118, and additional control logic (not shown in FIG. 1).

The network element receives and sends packets from/to the network, and temporarily stores the packets in Buffer 114. According to embodiments of the present invention, the Buffer may concurrently store a plurality of packets that are processed concurrently and belong to multiple processes or flows. As such, the Buffer is referred to herein as a Shared Buffer. In some embodiments, the shared buffer may store, additionally or alternatively, control structures that pertain to the flow of packets (e.g., queues of packet descriptors).

In embodiments according to the present invention, BCM 118 continually records the status of the various logical buffers in local memory. According to the example embodiment of FIG. 1, BCM 118 will, responsive to the occurrence of pre-defined diagnostics events, stop recording the buffer status (in effect, freezing the buffer-status image), and send an Interrupt to the CPU. The CPU will then read the buffer-status recording (for example, to memory 108). The buffer-status recording will remain frozen until a coherent recording ("snapshot") is read. Thereafter, status recording may resume.

Thus, according to the example embodiment illustrated in FIG. 1, network element 100 will record the shared buffer status, and provide a coherent snapshot of the status to the CPU upon the occurrence of diagnostics events, allowing a network maintenance program to analyze the cause of network congestions, and take measures to prevent or to reduce congestion-related failures.

In an embodiment, a software program running in CPU 106 may start and stop buffer status recording by the BCM. In some embodiments, the software may selectively turn on and off recording of specific buffers or groups of buffers.

As would be appreciated, the structure of Network Element 100 described above is cited by way of example. Network elements in accordance to the disclosed techniques are not limited to the description hereinabove. In alternative embodiments, for example, the CPU may comprise multiple CPUs; the memory may be embedded, fully or partially, in the CPU, and there may be more than one bus.

In some embodiments an external CPU may be used, which is not part of the network element. The interrupt output from BCM 110 may not be required (for example, the CPU may, instead, repeatedly read an indication that diagnostics events have occurred); BCM 108 may write the snapshots in the memory, and, additionally or alternatively, send the snapshots over the network.

Figure 2:
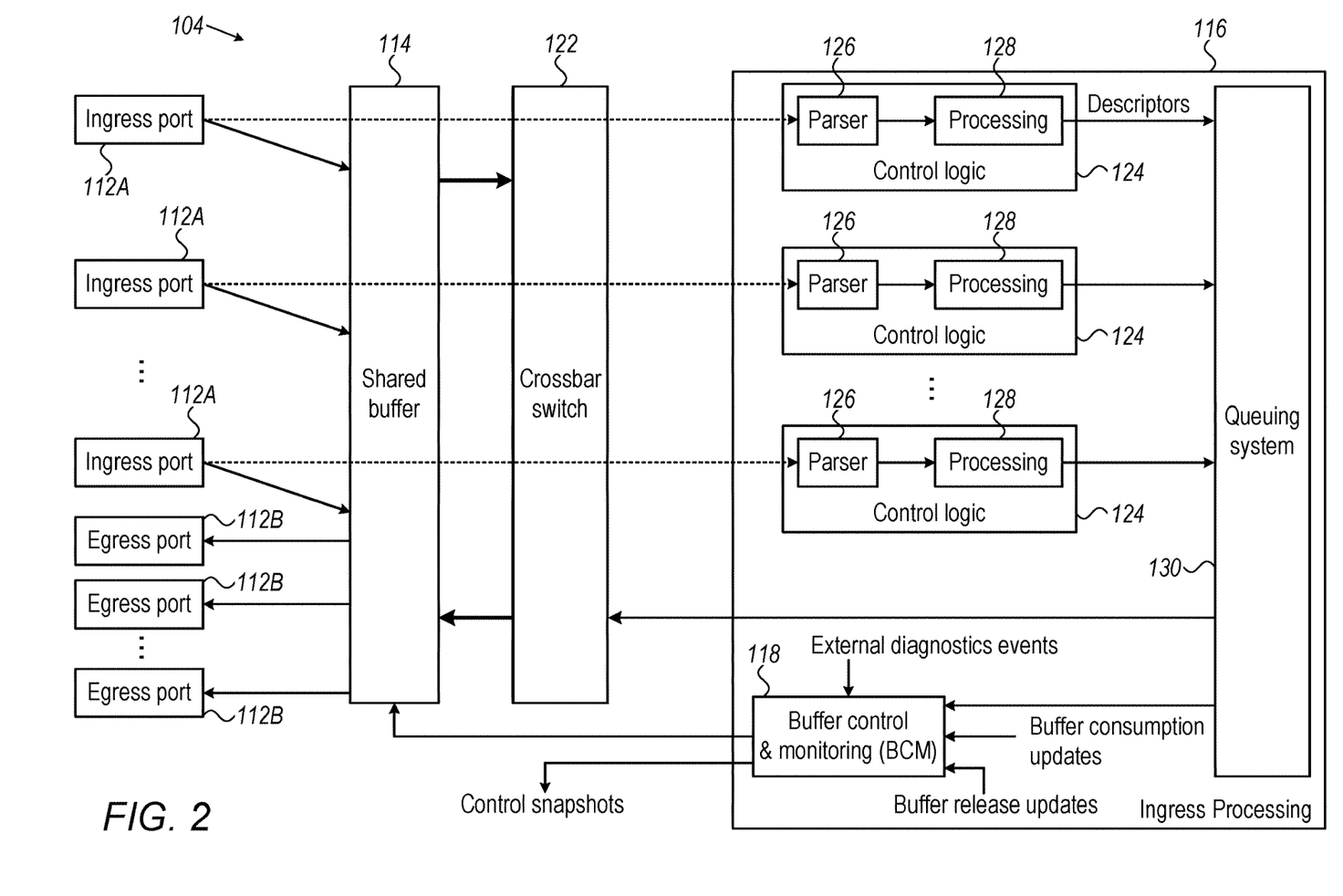
FIG. 2 is a block diagram that schematically illustrates a packet processing unit of a network element, in accordance with an embodiment of the present invention.

FIG. 2 is a block diagram that schematically illustrates Packet Processing unit 104 of a network element, in accordance with an embodiment of the present invention. (The Packet Processing unit was briefly described with reference to FIG. 1; further details are provided hereinbelow.)

Packet Processing unit 104 comprises one or more Ingress Ports 112A, which are configured to receive packets from the network; one or more Egress Ports 112B, which are configured to send packets to the network; a Shared Buffer 114, coupled to the Ingress and Egress ports, and configured to temporarily store packets (and, in some embodiments, packet related data); and, a Crossbar Switch 122, which is configured to transfer packets between logical buffers of the shared buffer.

The units of packet processing 104 described above, including ingress and egress ports 112, shared buffer 114 and crossbar switch 122, are collectively referred to as the data-plane of the network element (although, in some embodiments, the shared buffer may also store control structures). Packet Processing unit 104 further comprises an Ingress Processing Unit 116, which is configured to control the flow of packets (and is sometimes referred to as the Control Plane). The ingress processing unit comprises a plurality of control logic units 124, which are configured to process packet headers; a Queuing System 130, which is configured to queue packets for egress transmission; and, a BCM 118.

The control logic units are coupled to the ingress ports, and receive the headers of the packets that are transferred from the ingress ports to the shared buffer.

Each control logic unit comprises a parser 126, which extracts data from the packets headers, and a Processing unit 128, which builds packet descriptors (according to embodiments of the present invention, packets descriptors are compact data structure, which comprise data pertaining to the handling of the packet, including, for example, destination queue, size and priority). The control logic units send packet descriptors to the queuing system.

BCM 118 is configured to control the shared buffer, and to record the buffer-control status. The BCM divides the shared buffer to logical buffers, and, manages the logical buffers as one or more first-in first-out queues, for storing packets and/or packet related data.

The BCM receives buffer consumption updates and buffer release updates from various circuits of the ingress processing unit. The BCM may dynamically change the allocation of buffer space to the various queues, including, for example, spilling of packets from congested to non-congested queues.

According to embodiments of the present invention, the BCM continuously records the control status of all or part of the logical buffers, in control-status recordings. The BCM is further configured to detect diagnostics events (for example, the occupancy of a queue exceeding a programmed threshold), and to receive external diagnostic events (for example, a packet-drop). In response to the occurrence of diagnostics events, the BCM is configured to freeze the recording of the control status, and to send a coherent control-status snapshot.

Thus, according to the example embodiment of FIG. 2, the control of the shared memory is recorded in a BCM. Upon the occurrence of diagnostics events, the recording is stopped, and the BCM sends a coherent snapshot of the control status. A user such as a network-maintenance program may analyze the snapshot, and take preventive or corrective measures, to avoid network performance degradation.

As would be appreciated, the structure of Packet Processing Unit 104 described above is cited by way of example. Packet Processing Units in accordance to the disclosed techniques are not limited to the description hereinabove. In alternative embodiments, for example, the contents of the control-status recording may be different. In some embodiments, the recordings comprise the complete buffer status; in other embodiments, the recordings comprise a subset of the buffer status, which may be fixed or programmable. Likewise, in some embodiments, only parts of the status recording are sent from the buffer management and monitoring (for example, respective to the source of the diagnostic event). In an embodiment, the recording may be compressed. In some embodiments, the local memory that stores the control-status recording comprises a double-buffer, and, when a snapshot is read from one half of the buffer, recording may continue to the other half.

In some embodiments, the same control-logic unit may serve more than one ingress port; in some embodiments, a pull of control-logic units is dynamically allocated to ingress ports.

Figure 3:
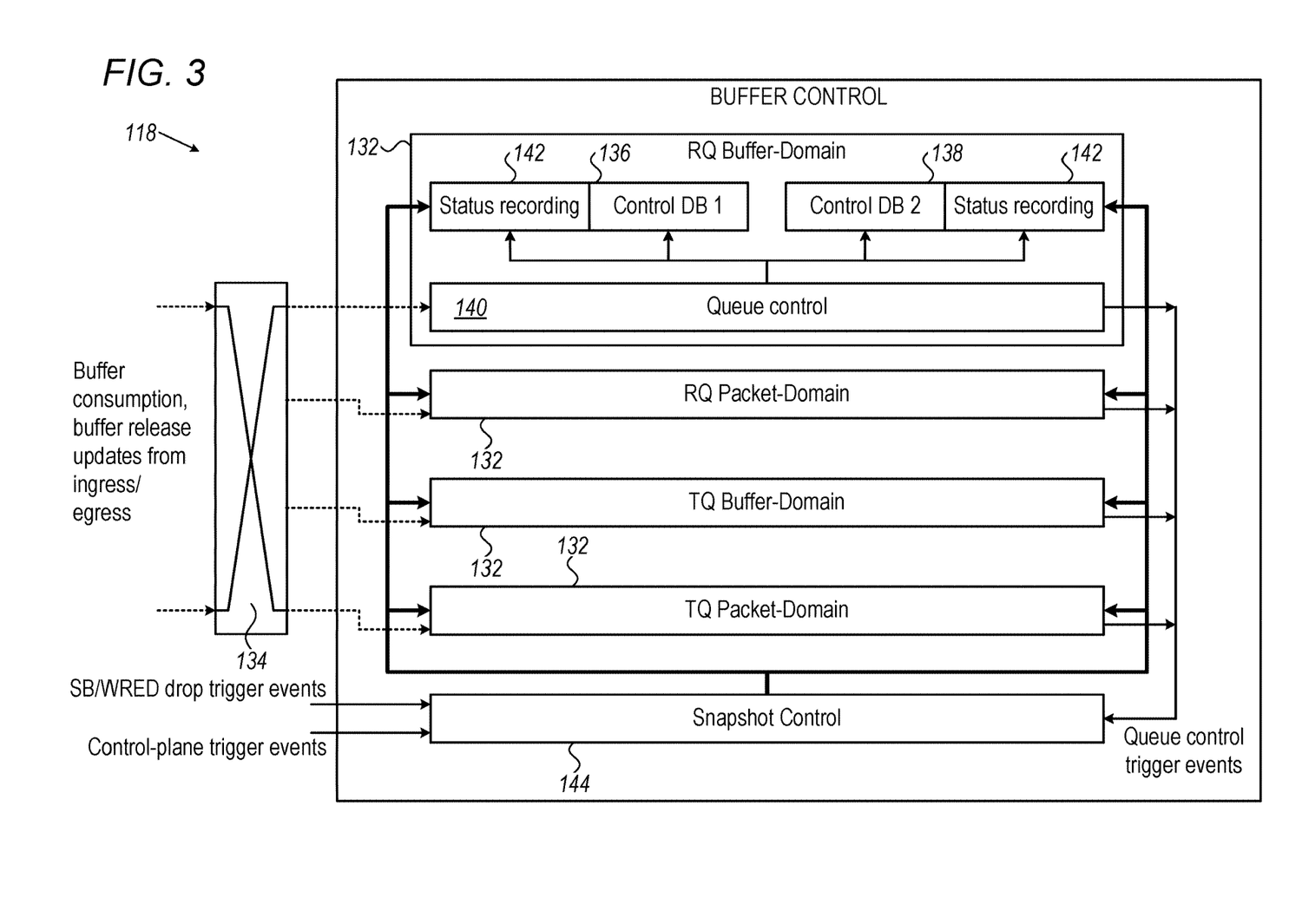
FIG. 3 is a block diagram that schematically illustrates a Buffer Control and Monitoring unit (BCM), in accordance with an embodiment of the present invention.

FIG. 3 is a block diagram that schematically illustrates a Buffer Control and Monitoring unit (BCM) 118, in accordance with an embodiment of the present invention. The BCM comprises four Buffer-Control units 132, which are configured to control buffers of a packet-receive-queue, a packet-descriptor-receive-queue, a packet-transmit-queue and a packet-descriptor-transmit-queue; and a consumption-update router unit 132, which is configured to route buffer consumption (and buffer release) updates to a corresponding Buffer-Control 132.

According to the example embodiment of FIG. 3, the control-status of the queues is organized in control databases (Control DB). In the example embodiment of FIG. 3, each Buffer-Control 132 comprises two Control DBs—a first Control DB 136 and a second Control DB 138 (in alternative embodiments, a different number of DBs or a single DB can be used). Each Buffer-Control 132 further comprises a Queue Control 140; and, Status Recording units 142, that are coupled to Control-DB units 136. Queue-Control units 140 are configured to control a corresponding queue in the shared buffer, respective to control-status that is stored in Control DBs 136 and 138, and to detect diagnostics events pertaining to a corresponding queue (for example, when the occupancy of the queue exceeds a preset threshold). Status recording units 142 comprise suitable memories (referred to herein as "snapshot memory"), and are configured to continuously store (record) the control status that is stored in DB 136 and 138 in the memory.

BCM 118 further comprises a Snapshot Control unit 144, which is coupled to Status Recording units 142. The Snapshot Control Unit receives diagnostics events pertaining to the status of the queues from queue-control units 140. According to the example embodiment of FIG. 3, Snapshot Control 144 may receive additional diagnostics events such as packet drop or other preset triggers from sources that are external to the BCM.

Upon the occurrence of diagnostics events, Snapshot Control 144 indicates to Status Recording units 142 that the recording of the control-status should stop, and that the status recording units should transmit a copy (snapshot) of the control status recording.

According to the example embodiment of FIG. 3, the recorded status may comprise, in addition to the control-status of the packet queues, also the control-status of queues that pertain to ingress processing data, such as queues of packet descriptors. In embodiments according to the present invention, congestions on packet descriptor queues may cause performance degradation, and the analysis of a coherent snapshot of the control-status of all queues, including data-plane and control-plane queues, may be significant for the analysis and the prevention of network failures.

Thus, according to the example embodiment of FIG. 3, a BCM comprises status recording units that are configured to continuously record the control-status of queues of the network element; diagnostics events are detected by the BCM and/or input to the BCM from external sources. In response to the diagnostics events, the BCM may freeze the recording, and send a coherent snapshot of the control-status.

As would be appreciated, the structure of BCM 118 described above is cited by way of example. BCMs in accordance to the disclosed techniques are not limited to the description hereinabove. In alternative embodiments, for example, status recording may be done in a shared recording memory rather than distributed; and, Buffer-Control Units 132 may comprise data-compression circuitry, to compress the control DB prior to recording. In some embodiments, the BCM may send partial status recording, as defined by a suitable BCM driver software.

In some embodiments, due to pipeline delays, recording of the status control may lag after the actual queue status; the snapshot, therefore, may be deliberately delayed after the corresponding diagnostics event by a preset (or software-controlled) time period (e.g., a preset number of clock cycles).

Figure 4A:
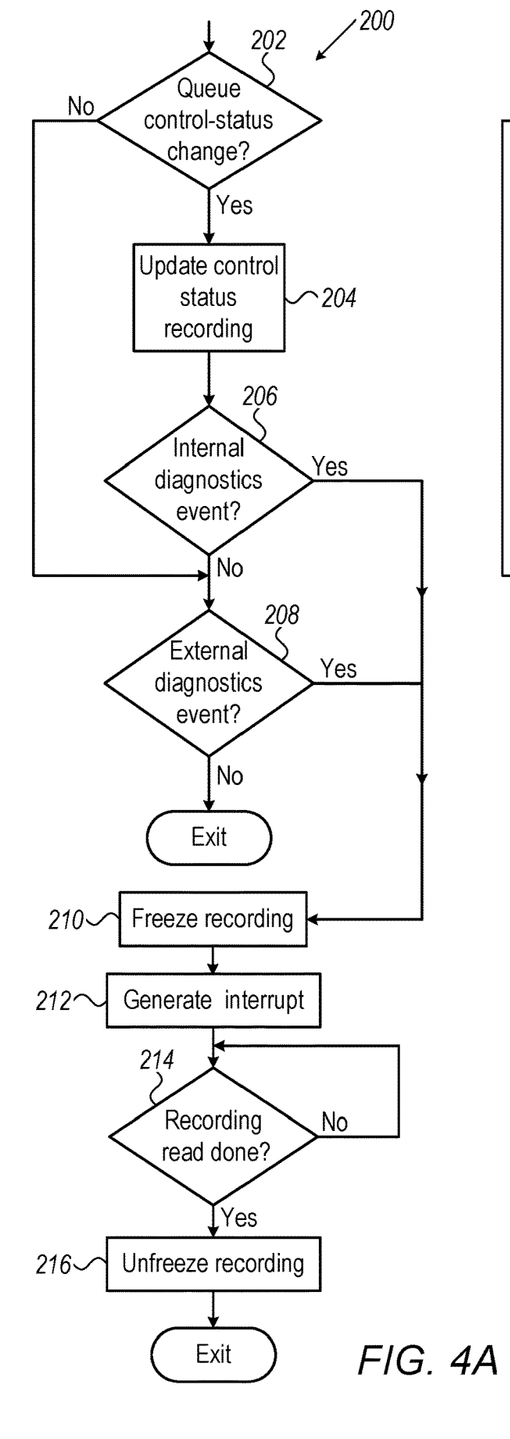
FIG. 4A is a flow chart that schematically illustrates a first method for coherent buffer status capturing, in accordance with an embodiment of the present invention.

FIG. 4A is a flow chart 200 that schematically illustrates a first method for coherent buffer status (snapshot) transmission, in accordance with an embodiment of the present invention. The flow chart is executed by BCM 118.

The flow starts at a Checking Control-Status-Change step 202, wherein the BCM checks if the control status of any queues has changed. If a control status has changed, the BCM enters an Updating Recording step 204, wherein the BCM records the status change, and then enters a Checking Internal Diagnostics Event step 206.

In step 206 the BCM checks if a diagnostics event has occurred, for example, the occupancy of one of the queues has exceeded a preset threshold. If an internal diagnostics event has not occurred, the BCM will proceed to a Checking External Diagnostics Event step 208 and checks if an external diagnostics event (e.g. —a weighted random early detection packet drop (WRED)) has occurred. If, in step 202, there is no status change, no internal diagnostics events could have occurred, and the BCM enters step 208, to check for external diagnostics event.

If no internal or external diagnostics events have occurred, the BCM will exit the flow (after step 208). If, however, an internal or an external diagnostics event is detected, in step 206 or in step 208, the BCM enters a Freeze Recording step 210, wherein the BCM stops the recording of the control status, so that a coherent snapshot could be read, and then enters an Interrupt step 212, wherein the BCM sends an Interrupt to the CPU.

After step 212, the CPU typically reads the snapshot. The BCM enters a Waiting-for-Read-Completion step 214 and waits until the CPU completes reading the snapshot. Further control-status recording will be suspended, so that a coherent snapshot will be read. After the snapshot is read, the BCM will enter an Unfreeze step 216, wherein the BCM resumes control-status recording, and the flow ends.

Figure 4B:
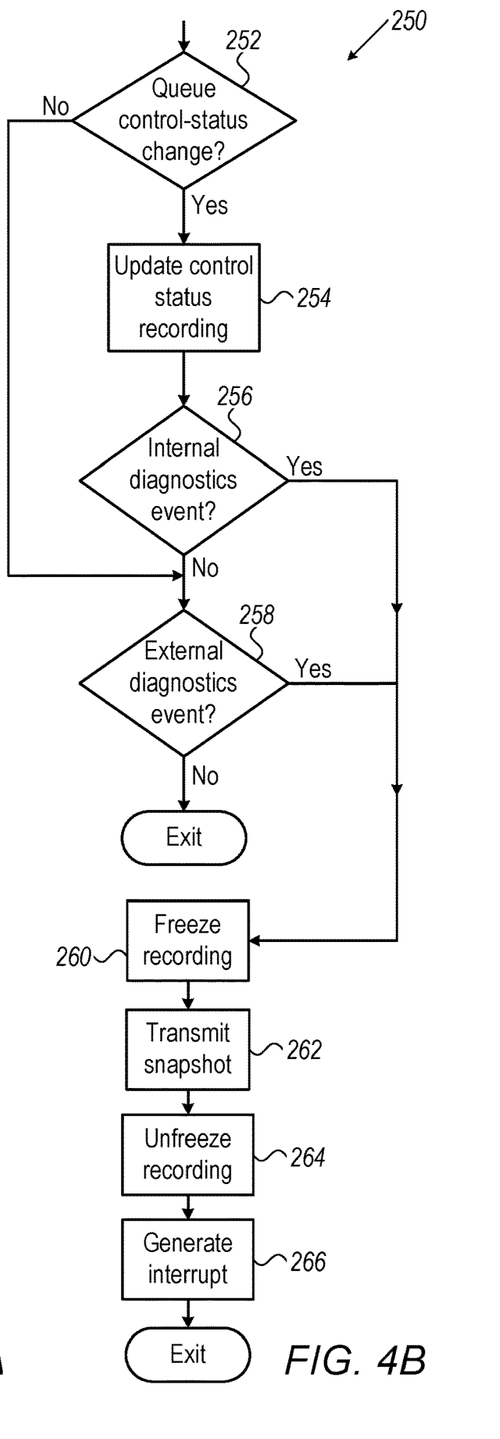
FIG. 4B is a flow chart that schematically illustrates a second method for coherent buffer status capturing, in accordance with another embodiment of the present invention.

FIG. 4B is a flow chart 200 that schematically illustrates a second method for coherent buffer status transmission, in accordance with an embodiment of the present invention. The flow chart is executed by BCM 118, and the first four steps are identical to the corresponding first four step of FIG. 4A: the BCM checks for queue status change in a Checking Queue-Status step 252; proceeds to update the recording in an Updating Recording step 254 and to a Checking-Internal-Diagnostics Events step 256 if a queue status change has occurred, or, to a Checking-External-Diagnostics-Event step 258 if no change has occurred. Like FIG. 4A, if there are no internal diagnostics events in step 256, the BCM enters step 258 to check for external diagnostics events.

Flow charts 4A and 4B differ when there are diagnostics events; while, according to the example embodiment of FIG. 4A, the CPU is Pulling the snapshot from the BCM, according to the example embodiment of FIG. 4B the BCM Pushes the snapshot. If, in step 256 or in step 258, diagnostics events have occurred, the BCM enters a Freeze step 260, freezing the updating of the recording, and then enters a Transmitting Snapshot step 262. In step 262, the BCM writes the snapshot to a pre-allocated region in memory 108 (FIG. 1). The BCM then enters an Unfreeze step 264, wherein the BCM resumes the recording of the control-status, and then enters a Generating Interrupt step 266, wherein the BCM generates an Interrupt, indicating to the CPU that a diagnostics event has occurred, and the snapshot is already in memory. After step 266 the flow ends.

In some embodiments, a "warm-up" period wherein the BCM waits for the queue to fill up takes place prior to the first steps of flow-charts 200 and 250 (steps 202 and 252, respectively). During the warm-up period, the BCM may ignore all (or some) diagnostics events. Only when the queue is full, does the BCM enter steps 202 (FIG. 4A) or step 252 (FIG. 4B).

Thus, according to the example embodiments illustrated in FIGS. 4A and 4B, a BCM may record the control status of the network element's shared buffer, detect diagnostics events and receive notifications of external diagnostics events; responsive to the diagnostics events, the BCM may freeze the recording, and either interrupt the CPU so that the CPU will read a coherent snapshot, or write the snapshot in memory and then interrupt the CPU to indicate that the snapshot is ready in memory. In either case, the recording of the buffer control-status will resume only after a coherent snapshot is available to the CPU.

As would be appreciated, flow-charts 200 and 250 are example flow-charts that are depicted purely for the sake of conceptual clarity. Other suitable flowcharts may be used in alternative embodiments of the present invention. For example, the BCM may stop the recording at a time after the occurrence of the diagnostics event; e.g. when the CPU starts reading the snapshot; parts of the flow chart (or the complete flow-chart) may be executed in parallel or at a different order; interrupt may not be generated (instead, the CPU may, repeatedly or occasionally, check if a diagnostics event has occurred and/or if a snapshot is available. In embodiment, the BCM never exits the flow-chart but, rather, when the BCM enters the steps marked as Exit in FIGS. 4A and 4B, the BCM restarts the flowchart. In some embodiments, the choice between Pulling flowchart 4A and Pushing flow-chart 4B is done dynamically, respective, for example, to CPU loading.

The configuration of Network element 100, including Packet Processing 104 and all units thereof and including methods 200 and 250, are example configurations and methods that are shown purely for the sake of conceptual clarity. Any other suitable configurations can be used in alternative embodiments.

In some embodiments, it may be desirable to prevent diagnostics monitoring for some flows. Ingress-Processing Unit 116 may detect such flows, and signal to the BCM that diagnostics events should be ignored.

In an embodiment, Network Element 100 may comprise latency measurement means (hardware, software, firmware, or combination thereof). In those embodiments, diagnostics events may be flagged responsive to the latency of any or all the packets.

In other embodiments, the BCM may initiate snapshots after a preset number of diagnostics events take place, and in yet other embodiments, when a diagnostics events occurs, the BCM waits a preset time, and then initiates the snapshot.

In various embodiments, the various tasks associated with recording and freezing the control status may be carried out by hardware, by software, or by combination of hardware and software.

In various embodiments, the different elements of Network Element 100, e.g., Ingress Processing Unit 116, BCM 118 and sub-units thereof, may be implemented using suitable hardware, such as one or more Application-Specific Integrated Circuits (ASIC) or Field-Programmable Gate Arrays (FPGA), or a combination of ASIC and FPGA.

CPU 106 of Network Element 100 typically comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address coherent control status snapshots in a network element, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   multiple ports, configured to communicate over a network;
   a buffer memory;
   a snapshot memory;
   circuitry, configured to:
      forward packets between the ports;
      temporarily store information associated with the packets in the buffer memory;
      change a control-status of the buffer as packets are forwarded;
      continuously write the control-status of the buffer memory to the snapshot memory, when the control-status changes, unless writing was stopped due to a diagnostic event; and
      in response to at least one predefined diagnostic event, stop writing of the control-status to the snapshot memory, so as to create in the snapshot memory a coherent snapshot of the control-status of the buffer corresponding to a time of the diagnostic event.

2. The network element according to claim 1, wherein the circuitry is configured to concurrently store in the buffer memory, and to include in the coherent snapshot, information relating to multiple packets associated with multiple processes or flows.

3. The network element according to claim 1, wherein the information comprises data carried by the packets.

4. The network element according to claim 1, wherein the information comprises descriptors of the packets.

5. The network element according to claim 1, wherein the circuitry is configured to detect the predefined diagnostics event as part of forwarding the packets.

6. The network element according to claim 1, wherein, in response to the predefined diagnostics event, the circuitry is configured to generate an interrupt indicative of the coherent snapshot.

7. The network element according to claim 1, wherein, in response to creation of the coherent snapshot, the circuitry is configured to send the coherent snapshot over the network.

8. The network element according to claim 1, wherein the circuitry comprises a compression circuitry which compresses the control-status before it is written to the snapshot memory.

9. The network element according to claim 1, wherein the buffer memory is divided into a plurality of separately controlled buffers, and wherein the continuously written control-status of the buffer memory comprises a separate control-status for each of the separately controlled buffers.

10. The network element according to claim 9, wherein the continuously written control-status of the buffer memory comprises fill levels of the separately controlled buffers.

11. The network element according to claim 9, wherein the continuously written control-status of the buffer memory comprises dynamically adjusted queue thresholds associated with the separately controlled buffers.

12. The network element according to claim 1, wherein the continuous writing by the circuitry comprises continuous update of the control-status of the buffer memory, in the snapshot memory.

13. A method, comprising:
   in a network element that includes multiple ports connected to a network, forwarding packets between the ports;
   temporarily storing information associated with the packets in a buffer memory in the network element;
   changing a control-status of the buffer as packets are forwarded;
   writing the control-status of the buffer memory to a snapshot memory in the network element, when the control-status changes, unless writing was stopped due to a diagnostic event; and
   in response to at least one predefined diagnostic event, stopping writing of the control-status to the snapshot memory, so as to create in the snapshot memory a coherent snapshot corresponding to a time of the diagnostic event.

14. The method according to claim 13, further comprising concurrently storing in the buffer memory, and including in the coherent snapshot, information relating to multiple packets associated with multiple processes or flows.

15. The method according to claim 13, wherein the information comprises data carried by the packets.

16. The method according to claim 13, wherein the information comprises descriptors of the packets.

17. The method according to claim 13, and comprising detecting the predefined diagnostics event as part of forwarding the packets.

18. The method according to claim 13, and comprising generating an interrupt indicative of the coherent snapshot, in response to the predefined diagnostics event.

19. The method according to claim 13, and comprising sending the coherent snapshot over the network in response to creation of the coherent snapshot.

20. The method according to claim 13, further comprising compressing the control-status before it is written to the snapshot memory.

21. The method according to claim 13, wherein continuously writing the control-status comprises continuously writing a separate control-status for each of a plurality of separately controlled buffers.

22. The method according to claim 21, wherein continuously writing the control-status comprises continuously writing fill levels of the separately controlled buffers.

23. The method according to claim 21, wherein continuously writing the control-status comprises continuously writing dynamically adjusted queue thresholds associated with the separately controlled buffers.

24. The method according to claim 13, wherein the continuously writing the control-status comprises continuous update of the control-status of the buffer memory in the snapshot memory.

* * * * *